United States Patent Office 2,814,637
Patented Nov. 26, 1957

2,814,637

PROCESS FOR PRODUCING CARBAMATES OF ACETYLENIC CARBINOLS

Philip Guy Marshall, Bramhall, John Herbert Barnes, Stalybridge, and Patrick Anthony McCrea, Alderley Edge, England, assignors to British Schering Research Laboratories Limited, Alderley Edge, England, a company of Great Britain No Drawing. Application June 17, 1955,
Serial No. 516,319

Claims priority, application Great Britain June 23, 1954

6 Claims. (Cl. 260—482)

This invention comprises new narcotic compounds having enhanced hypnotic activity and a favourable therapeutic ratio.

The new compounds according to the invention are carbamates of carbinols of the formula:

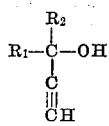

in which $R_1$ and $R_2$ are alkyl groups. In each case the alkyl group is preferably a lower alkyl group i. e. a group containing no more than four carbon atoms.

A particularly valuable compound of this class is the carbamate of 3-methyl-1-pentynol-3, i. e. the carbinol of the above formula in which $R_1$ is methyl and $R_2$ is ethyl. The activity of this carbamate is most marked even at a low dosage level and it is rapid in onset and prolonged in action. In addition it has a very favourable therapeutic ratio.

Compounds according to the above formula may be produced by bringing together an alkali metal cyanate and a solution comprising the starting carbinol, e. g. 3-methyl-1-pentynol-3, and trichloroacetic acid.

The solvent of said solution may be polar solvent such as dioxan, or a solvent possessing intermediate polar characteristics such as methylene dichloride which is capable of dissolving both the carbinol and trichloroacetic acid. The yield of the carbamate is, however, generally less when such a solution is used.

It is a further feature of the present invention that good yields of the carbamate are obtained when the solvent of the solution is provided wholly or substantially wholly by employing an excess of the carbinol sufficient to dissolve the trichloroacetic acid, or by employing a non-polar solvent such as carbon tetrachloride in the presence of a small excess of the carbinol.

However, the solvent of the solution may be provided mainly by an excess of the carbinol, there being used in addition a common solvent for the carbinol and for trichloroacetic acid.

The reaction between the alkali metal cyanate and the solution comprising the trichloroacetic acid and the carbinol may be allowed to proceed over a relatively long period, i. e. for some days, at room temperature. Alternatively the reaction may be made to proceed more quickly, i. e. over a period of less than one day, by applying heat. The temperature of the reaction mixture, however, should not be allowed to proceed beyond 80° C. and preferably not allowed to exceed 50° C. because higher temperatures may be detrimental to the yield and purity of the final product.

The invention is illustrated by the following examples:

*Example 1*

32.4 g. (0.4 mol) of finely powdered potassium cynanate are added to a solution of 39.2 g. (0.4 mol) of 3-methyl-1-pentynol-3 in 40 ml. of anhydrous dioxan, and the mixture is cooled in an ice bath. A solution of 65.2 g. (0.4 mol) of trichloroacetic acid in 40 ml. of anhydrous dioxan is then gradually added and the mixture is stirred overnight at room temperature. The suspension is poured into 1 litre of water and then 100 ml. of ether are added. The ether extract is washed with an aqueous solution of sodium bicarbonate and with water. After drying with anhydrous sodium sulphate the ether is distilled off and the residual oil distilled at 16 mm. pressure. The crude product is collected over the range 120–121° C. This product, which crystallises spontaneously giving colourless needles, has a melting point of 49.5–52° C. It is purified by chromatography and recrystallisation from cyclohexane. The melting point of the purified product is 53.5–55° C.

The following are the preferred examples:

*Example 2*

32.5 g. of dry sodium cyanate is added in portions, with stirring, to a solution 81.7 g. of trichloroacetic acid (previously dried in vacuo) in 100 ml. of 3-methyl-1-pentynol-3. During the addition the reaction mixture is cooled in ice-water and is then stirred at room temperature for 7 days whilst protecting it from moist air.

The reaction mixture is poured into water and the oil extracted with ether. The ether extract is washed with saturated sodium bicarbonate solution and finally with water.

After drying over anhydrous sodium sulphate, the ether is evaporated and the excess of 3-methyl-1-pentynol-3 is removed by distillation at a pressure of 10 mm. from an oil-bath at 70° C.

The residue is recrystallised from a mixture of 100 ml. cyclohexane and 200 ml. petroleum ether (40°–60° C.). The final product weighs 46.1 g. (65% of the theory based on trichloroacetic acid used) and has M. P. 52–53.5° C.

*Example 3*

To trichloroacetic acid (1634 g.) dried in vacuo in the reaction vessel, is added 3-methyl-1-pentynol-3 (2,500 cc., 2175 g.) and sodium cyanate (650 g.), also thoroughly dried. The suspension, protected from moist air and mechanically stirred, is heated at 45–50° C. for 20 hrs., then neutralised to approximately pH 7 by the addition of anhydrous sodium carbonate in small portions. After having cooled to about 30° C. the mixture is filtered, using a filter-aid, and the vessel is rinsed with carbon tetrachloride: this solvent (about 200 ml., in all) is used to wash the filter-cake which consists mainly of sodium trichloroacetate. The carbon tetrachloride is removed from the filtrate under a slightly reduced presure. Unreacted methylpentynol is then distilled off at 6 mm. pressure with slight heating; the distillation is concluded when the temperature of the residue has reached 50° C. Approximately 1240 g. methyl-pentynol is recovered. The crude residue is then treated by pouring in two volumes of water and stirring at 45° C. An oil separates and solidifies on cooling to room temperature with vigorous stirring. The yellowish powder is collected and thoroughly dried. Yield, 1138 g. M. P. about 40° C. Recrystallisation from cyclohexane gives an almost white product (940 g.), M. P. 53–55° C. The aqueous medium left over after the solidified oil has been collected, when cooled in ice for 24 hours, affords a further 22 g. of pure material, so that the total yield is 962 g. (68%).

In an analogous manner to what has been described in Examples 2 and 3 above there will also be produced in good yield the corresponding carbamates of the general formula given above in which, for example, $R_1=R_2=$ ethyl or methyl; or $R_1=$ethyl or methyl and $R_2=$n-propyl.

What is claimed is:

1. Process for producing carbamates of carbinols of the formula:

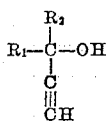

in which $R_1$ and $R_2$ are alkyl groups, by bringing together under substantially anhydrous conditions an alkali metal cyanate and a solution comprising the starting carbinol and trichloroacetic acid at a temperature not exceeding 80° C.

2. Process according to claim 1 in which the solvent of said solution is provided substantially wholly by employing a sufficient excess of the carbinol.

3. Process according to claim 1 in which the solvent of said solution is provided mainly by employing an excess of the carbinol, there being used in addition a common solvent for the carbinol and for trichloroacetic acid.

4. Process according to claim 1 in which the solvent of said solution is a non-polar solvent in which the carbinol and trichloroacetic acid are soluble, there being present a small excess of the carbinol.

5. Process according to claim 1 in which heat is applied to produce a reaction temperature not exceeding about 50° C.

6. Process as claimed in claim 1 in which the reaction mixture at the end of the reaction is neutralised to approximately pH 7.

References Cited in the file of this patent

UNITED STATES PATENTS

| 2,798,885 | Ensslin et al. | July 9, 1957 |

FOREIGN PATENTS

| 518,938 | Belgium | Apr. 30, 1953 |
| 704,851 | Great Britain | Mar. 3, 1954 |
| 1,079,916 | France | May 26, 1954 |

OTHER REFERENCES

Blohm et al.: Chem. Reviews 51 (1952), pp. 472–4.